(12) United States Patent
Ballagh et al.

(10) Patent No.: US 8,207,969 B1
(45) Date of Patent: Jun. 26, 2012

(54) METHOD OF ABSTRACTING A GRAPHICAL OBJECT IN A LINE ART STYLE SUITABLE FOR PRINTING AND ARTWORK-COLORING

(75) Inventors: Jonathan B. Ballagh, Boulder, CO (US); Thomas E. Fischaber, Golden, CO (US); Roger B. Milne, Boulder, CO (US); Krista M. Marks, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 1062 days.

(21) Appl. No.: 11/956,467

(22) Filed: Dec. 14, 2007

Related U.S. Application Data

(60) Provisional application No. 60/870,019, filed on Dec. 14, 2006.

(51) Int. Cl.
*G06T 11/20* (2006.01)
(52) U.S. Cl. ........ 345/441; 345/418; 345/440; 345/442; 345/443; 345/467; 345/468; 345/469
(58) Field of Classification Search .................. None
See application file for complete search history.

(56) References Cited

U.S. PATENT DOCUMENTS

| 4,931,783 | A | | 6/1990 | Atkinson |
| 5,262,760 | A | * | 11/1993 | Iwamura et al. ............... 715/861 |
| 5,416,852 | A | * | 5/1995 | Kumamoto .................... 382/199 |
| 5,515,496 | A | | 5/1996 | Kaehler |
| 6,654,495 | B1 | * | 11/2003 | Katoh et al. ................... 382/178 |
| 6,819,345 | B1 | | 11/2004 | Jones |
| 2003/0098862 | A1 | * | 5/2003 | Hunt et al. ..................... 345/418 |
| 2006/0023940 | A1 | * | 2/2006 | Katsuyama .................... 382/165 |
| 2006/0074870 | A1 | | 4/2006 | Brill |

* cited by examiner

*Primary Examiner* — Kee M Tung
*Assistant Examiner* — Jwalant Amin
(74) *Attorney, Agent, or Firm* — Farjami & Farjami LLP

(57) ABSTRACT

Various approaches are disclosed for generating an output graphical object from an input graphical object. In one approach, vector graphics data representing the input graphical object in a memory are stored. A first subset of the vector graphics components of the vectors graphics data to leave unchanged for the output graphical object, a second subset of vector graphics components to alter for the output object, and a third subset of vector graphics components to discard from the output object are determined. Each vector graphics component in the second subset is altered, and the first and altered second subsets of vector graphics components as the output graphical object.

26 Claims, 4 Drawing Sheets

METHOD OF ABSTRACTING A GRAPHICAL OBJECT IN A LINE ART STYLE SUITABLE FOR PRINTING AND ARTWORK-COLORING

RELATED PATENT DOCUMENTS

This patent document claims the benefit, under 35 U.S.C. §119(e), of U.S. Provisional Patent Application No. 60/870,019, filed Dec. 14, 2006 and entitled: "METHOD OF ABSTRACTING A GRAPHICAL OBJECT IN A LINE ART STYLE SUITABLE FOR PRINTING AND ARTWORK-COLORING" which is fully incorporated herein by reference.

TECHNICAL FIELD

The present invention relates generally to computer systems and more specifically to a method of abstracting a computer graphics object in a line art style suitable for printing and artwork-coloring.

BACKGROUND

Black and white images are common across many forms of media. However, this characterization of "black and white" is ambiguous. Images commonly referred to as black and white are typically either monochromatic or grayscale images. The term monochromatic, as used herein, refers to an image made up of exactly one color which can be either on (black) or off (white). The term grayscale, as used herein, refers to an image made up of black, white, and various intermediary shades of gray.

Graphics applications such as PAINT™, which is available from Microsoft Corporation, of Redmond, Wash., and Adobe ILLUSTRATOR™, which is available from Adobe Systems Incorporated, of San Jose, Calif. generally give users the ability to create graphical objects, such as a depiction of a person, a table, or a chair. As used herein, the term graphical object is an object in a graphics application that includes features that can be manipulated and rendered by the graphics application. Graphical objects are frequently depicted as being part of a graphical scene. Generally, a graphical scene is a collection of graphical objects that may be rendered or displayed within a graphical canvas, and are often created with an artistic or pedagogic intent.

Vector graphics and raster graphics are two types of formats for describing graphical objects. Vector graphics are composed of geometrical primitives, including lines, curves, and other shapes, and may be scaled continuously in size without a loss of graphical quality. Raster graphics, on the other hand, are composed of a finite number of pixels and are, by nature, of a fixed size. Both vector and raster graphics are formats that are commonly used by those with normal skill in the art of computer graphics, and are supported by most popular graphical application software packages.

The Scalable Vector Graphics (SVG) format is a commonly-used language for describing images using vector graphics. SVG is a markup language, signifying it as a language used to describe a particular form of data, in this case, data of a graphical nature. An SVG file contains instructions for creating lines, curves, and shapes as well as information about the attributes of such lines, curves, and shapes. These attributes may include stroke width (a measure of the thickness of the line or, in the case of a shape, the line that forms the outline of the shape), stroke color, scale, fill pattern, fill color, line path, shape, rotational orientation, and relational position to name a few. Herein the term stroke is to define a line, or connected component, on the graphical canvas that represents the visible outline of a graphical object. Strokes may be described in terms of a set of criteria, including, but not limited to width, length, and curvature.

Graphics applications often enable users to convert or abstract a color graphical object into a black and white image by various methods. These methods include discarding color information using commonly known quantization techniques, adjusting image bit depth (also referred to as color depth or pixel depth), desaturation, using various software filters or plug-ins, or using a channel mixer to combine the color channels of an image into a single grayscale channel to name a few.

Current mechanisms fail to offer an automated method of abstracting colored graphical objects in such a way as to derive a line art abstraction from the original graphical object that is suitable for printing and artwork-coloring. For example, children's line art coloring books are often produced by media companies and feature popular characters, often cartoon, from popular movies, television shows, and books to name a few. Typically, these characters and scenes are manually redrawn by hand by an artist or artists in order to produce a variation on the original style that is suitable for artwork-coloring. These manual approaches are time-consuming and resource intensive, however.

Moreover, current automated mechanisms of both monochromatic and grayscale conversion also fail to produce grayscale line art of sufficient artwork-coloring quality. These mechanisms often fail to distinguish between significant details (for example, object outline strokes) and background colors in graphical objects; for example, the use of common methods of grayscale conversion on a circle filled with dark or black color(s) results in a dark region too dark to be artwork-colored when printed. For example, a black top hat object in colored cartoon scene may be filled using a dark color such as black. The same top hat from said scene would be inappropriate for line art coloring however, and would ideally be replaced by an outline of the image filled with white.

Current mechanisms for monochromatic conversion are also insufficient, as they often introduce extraneous visual artifacts into the resulting image. In addition monochromatic images, are, by nature, unable to display anti-aliasing, and are thus often unsightly. Moreover, monochromatic conversion may rely on thresholding techniques understood by those with normal skill in the art, a technique which would fail to differentiate between the top hat outline and the top hat fill color in the aforementioned example.

Current mechanisms for line art generation using popular edge detection software algorithms (for example, Sobel, Canny, Hough Transform, Difference of Gaussians to name a few) can consume considerable processor time to complete and often misinterpret important details in the resulting line art images. For example, it is also common for edge detection algorithms to produce disjoint lines, or to unnecessarily merge lines in the case of image occlusion and overlapping image regions.

In addition, both grayscale and monochromatic conversions of current mechanisms may be difficult for users who have little or no computer knowledge to perform. Children, for example—often the people most interested in artwork coloring—may be unable to do make such conversions because the intricacies of today's complicated graphics applications must first be learned.

BRIEF DESCRIPTION OF THE DRAWINGS

The foregoing aspects and many of the attendant advantages of this invention will become more readily appreciated with reference to the Detailed Description in conjunction with the accompanying drawings, wherein.

DETAILED DESCRIPTION

Figure 1A:
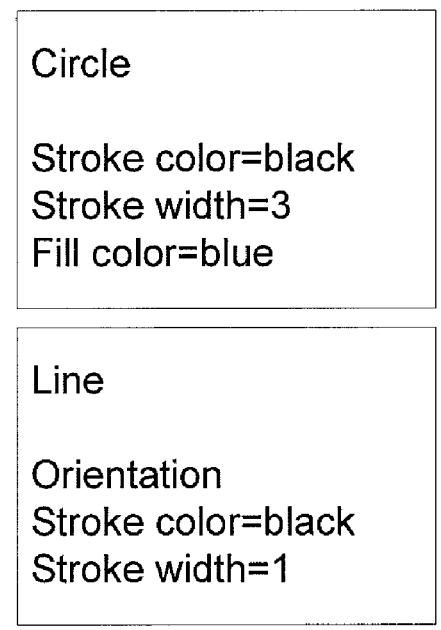
FIG. 1 depicts the contents of an SVG file before abstraction by an embodiment of the invention, as well as a picture of said file as may be represented on a computer screen.

Various embodiments of the present invention are now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this description, the term "module" is intended to refer to a computer-related entity, either hardware, a combination of hardware and software, software, or software in execution. For example, a module may be, but is not limited to being, a process running on a processor, a processor, an object, an executable, a thread of execution, a program, and/or a computer. By way of illustration, both an application running on a server and the server can be a computer module. One or more modules may reside within a process and/or thread of execution and a module may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The various embodiments of the invention provide an efficient automated method for abstracting a graphical object in a computer desktop environment in a line art style suitable for printing and artwork-coloring. Furthermore, this method may be automated and can be executed expeditiously by users of normal skill in the art of modern computer use.

Figure 3:
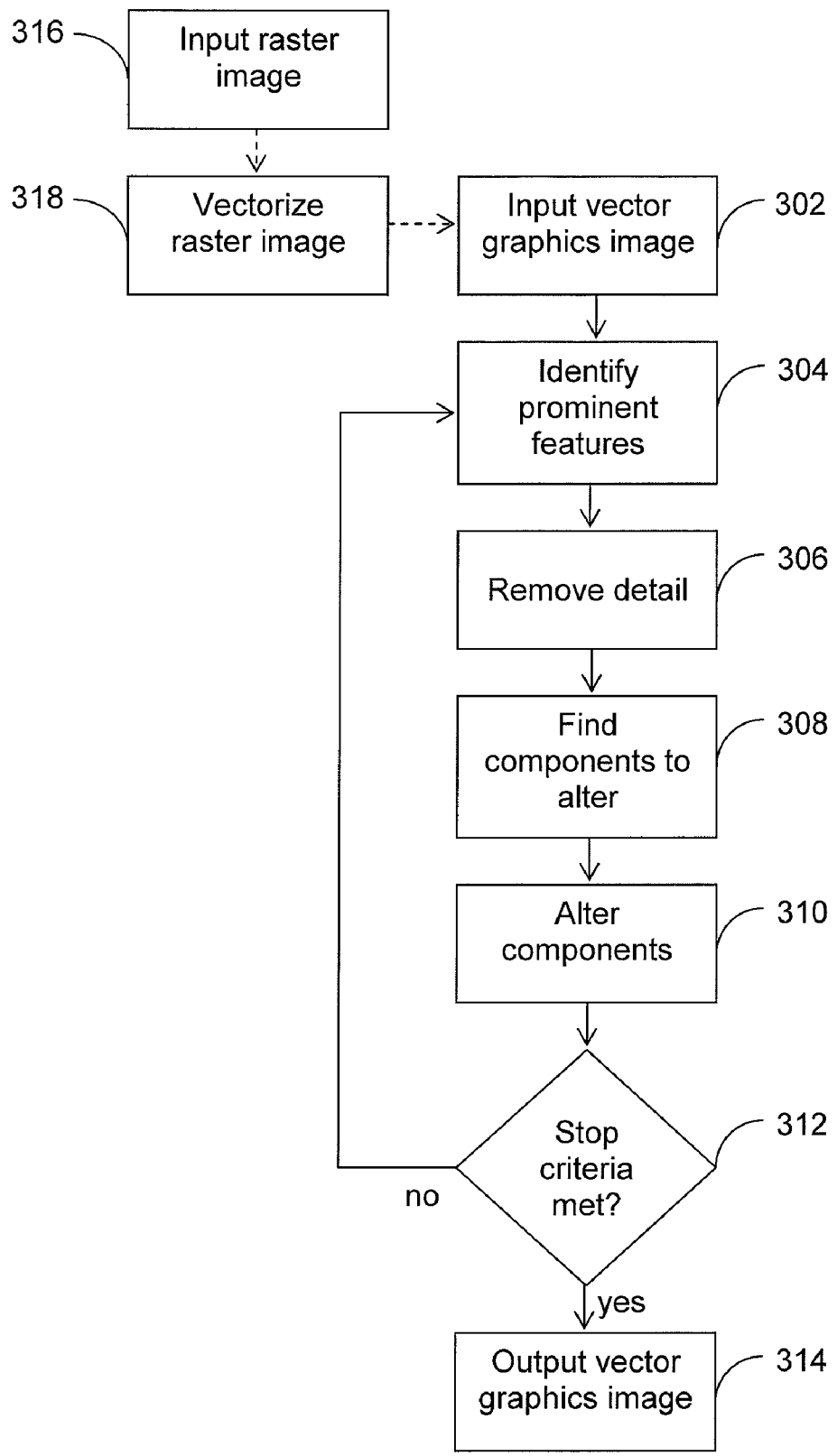
FIG. 3 depicts the steps involved in the process of abstracting an image object into a line art image suitable for artwork-coloring.

With reference to FIG. 3, an example method 300 for abstracting an image input source into line art suitable for printing and artwork-coloring is provided. In step 302, a vector graphics input file is read and parsed by a processor-based software application that constructs a well defined tree structure from this information. Tree structures used by said method may include a DOM (Document Object Model), SAX (Simple API for XML) or other structures as will be understood by those skilled in the art. Methods for building a tree structure from the vector image input file are widely available, including the JAVA™-based BATIK™ SVG toolkit, by The APACHE™ Software Foundation, which allows viewing, generation, and manipulation of SVG images.

In a second method, which may be optionally invoked before step 302, a commercial off-the-shelf graphics application such as Adobe ILLUSTRATOR, which is available from Adobe Systems Incorporated, is used to facilitate the conversion of a raster image input file 316 into a vectorized image format such as SVG (step 318). Such techniques are commonly used by those skilled in the art of graphics manipulation. Said vectorized SVG file is then used as the vectorized input to step 302. This approach may allow for the conversion of both vectorized graphic and raster image formats into line art suitable for artwork coloring.

Figure 1B:
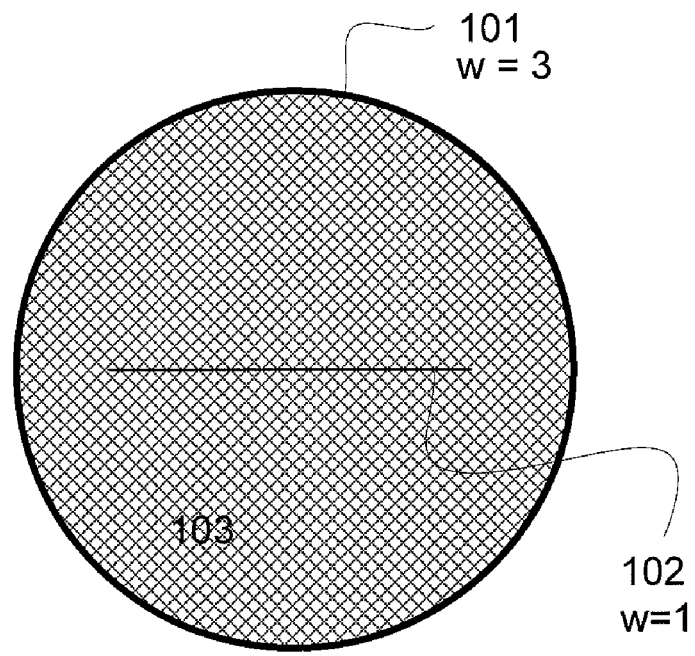

FIG. 1a contains a set of example pseudo instructions as may be contained in an example SVG input file. FIG. 1b shows a way in which said vector graphics file may be rendered and displayed on a computer screen. In FIG. 1b, the line that forms circle 101 has a stroke width w=3, whereas line 102 contained within circle 101 has a stroke width of w=1. Circle 101 also contains a blue fill color 103, as represented by a grid fill pattern inside the circle object.

Once a vector graphical object's image data has been parsed, this data may be manipulated to create new, similar, or dissimilar vector graphical objects. A first software process is run (step 304) on the image tree structure to identify prominent features of the image which are preserved during the line art conversion. The software process first identifies a set of prominent strokes in the image, which may be interpreted as line art outlines of prominent image features. Selection methods for identifying said strokes include, but are not limited to, looking for stroke objects with a thickness within specified width tolerances, looking for stroke objects that are within a specified color tolerance, and looking for stroke objects that may fall under a certain shape classification, for example, as an outline on a shape primitive.

In one embodiment of the invention, the stroke width tolerance may be set to a constant threshold value. In a second embodiment of the, the stroke width tolerance may be computed by collectively analyzing stroke objects within a particular region, or by collectively analyzing all strokes in an image. Techniques for computing a threshold value are well known by those skilled in the art of statistical analysis, and may involve techniques such as histogram analysis or other data binning techniques.

Strokes that are deemed unimportant in step 304 are considered extraneous detail, and are discarded in step 306, meaning that they are not present in the resulting line art image. In other words, discarded strokes are not added to the image data that is accumulated in order to create the final image. This step may be meant to preserve the original character of the image while removing unnecessary detail and clutter.

In step 308, the process determines the set of image components to alter. Components that may need altering include colored image fills, image features with opacity, and image features with brightness or other image attributes that fall outside of allowable tolerances. Criteria that may qualify an image for needing alterations may include graphical objects with non-white fills, graphical objects with opacity fills above or below a desired threshold value, strokes with a width or length above or below a desired threshold value, and graphical objects with a brightness above or below a desired threshold value, to name a few. Herein the term fill is used to denote the coloring, shading, or pattern inside a graphical object. Said criteria may be configured differently for individual images in order to achieve various stylized renderings of the final image abstraction, and may be parameterized according to individual user preferences.

In step 310, the image components identified in step 308 are altered by the process. Methods of altering components may include changing the fill color of colored regions to white, adjusting the opacity of a graphical object or its components, or adjusting pixel brightness values to name a few. The width of prominent image strokes may also be varied in step 306. In one embodiment, the width of said strokes are adjusted to a constant thickness, or quantized into one of a predefined range of thicknesses to increase uniformity of line widths in the resulting line art image. In another embodiment, the width of said strokes is left unaltered.

Figure 2A:
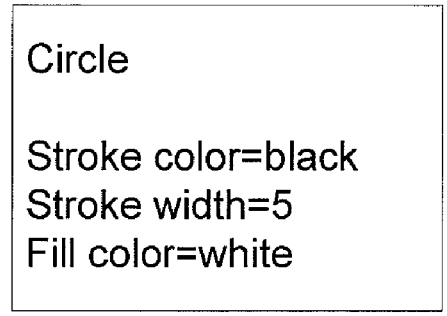
FIG. 2 depicts a state of the same SVG file after being abstracted by an embodiment of the invention, as well as a picture of said abstracted file as may be represented on a computer screen.
Figure 2B:
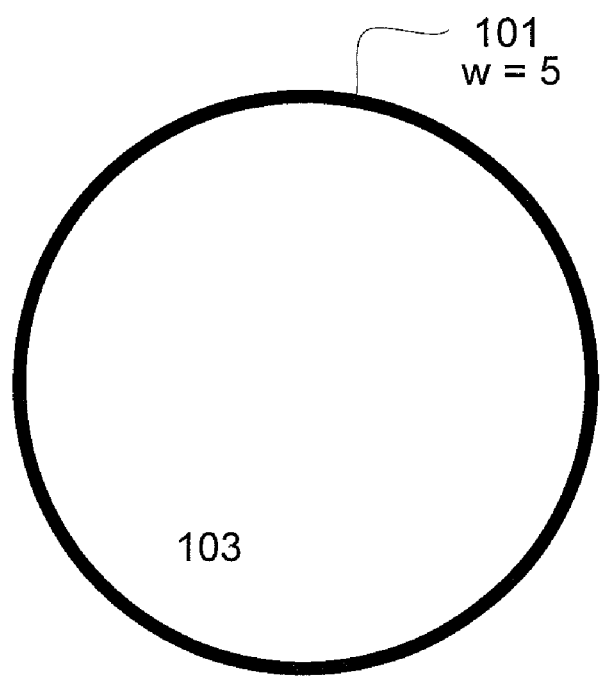

In FIG. 2, methods for altering the fill color and stroke width of circle 101 have been employed. FIG. 2a contains a set of pseudo instructions as may be contained in an SVG file after application of the processes described herein. FIG. 2b shows a way in which said vector graphics file may be displayed on a computer screen or on a printed page. In FIG. 2, the stroke width of circle 101 has been increased to w=5. Line 102, present in FIG. 1b, has been removed because its stroke width was below a stroke width threshold. The fill color of circle 101 has been changed; circle 101 now contains a white fill color 103 instead of a blue fill color.

At this point, the process analyzes the resulting image data (step 312) and determines if the stop criteria have been met. Methods for determining stop criteria may included deciding if the amount of image detail is within an allowable tolerance. If the stop criteria are not met, the process returns to step 304, and repeats until the stop criteria are met in step 312.

Once the stop criteria are met, the process generates the line art image as vectorized output in step 314, which may or may not include converting and writing the vectorized image output to a computer file format that may be easily printed using a commercial, off-the-shelf printer, or converting and writing the vectorized image output to a raster image format (for example, JPEG, BMP, GIF, etc.). Methods for saving vector graphics and converting vector graphics into raster images are widely available and known by those of normal skill in the art, and include the Java-based Batik SVG toolkit, by the Apache Software Foundation, IMAGEMAGICK™ software from ImageMagick Studio, LLC, to name a few.

Figure 4:
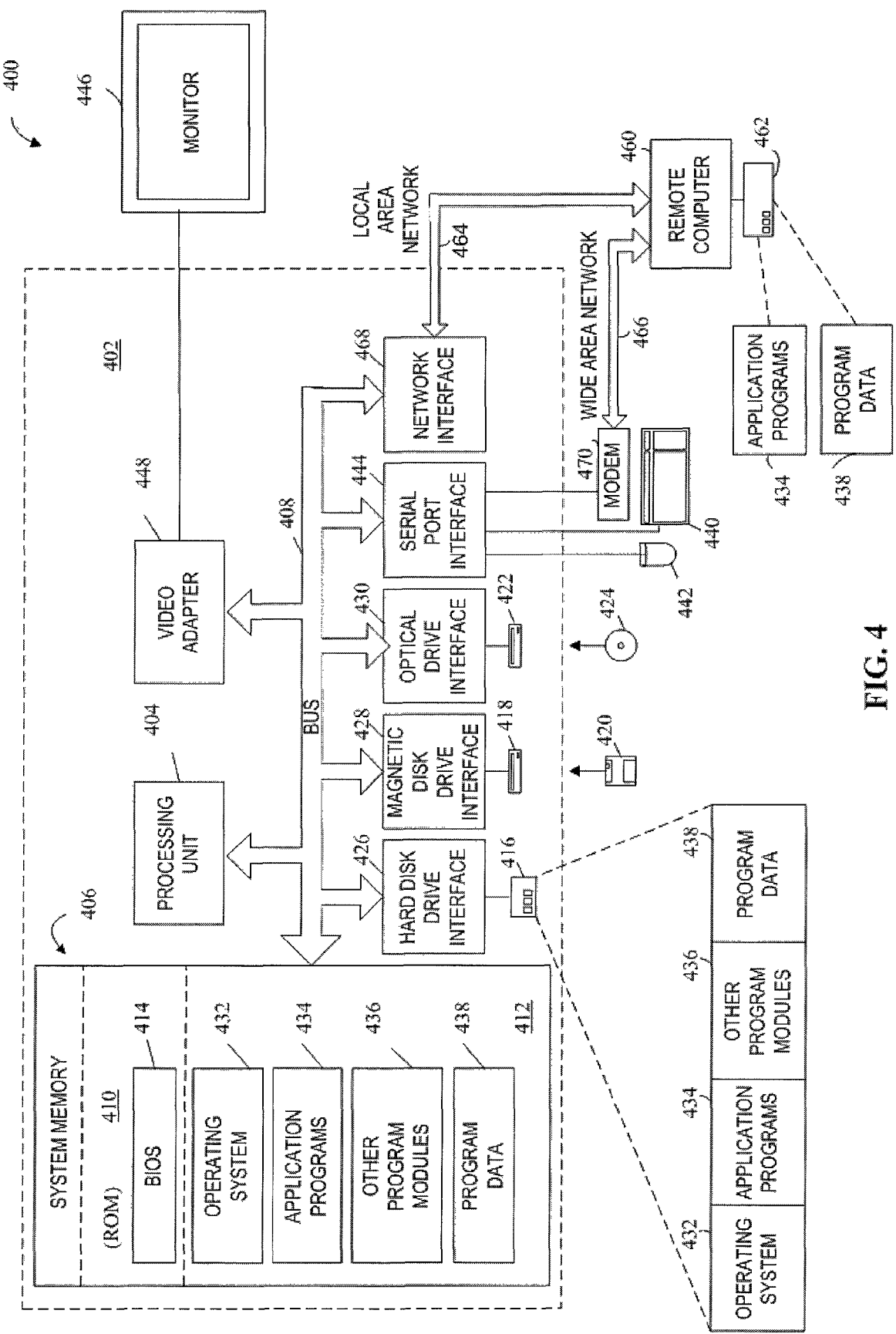
FIG. 4 depicts one example system environment for implementing one or more embodiments of the invention.

In order to provide additional context for implementing different embodiments, FIG. 4 and the following discussion are provided. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

With reference to FIG. 4, an example system environment 400 for implementing the various aspects of the invention includes a conventional computer 402, including a processing unit 404, a system memory 406, and a system bus 408 that couples various system components, including the system memory, to the processing unit 404. The processing unit 404 may be any commercially available or proprietary processor. In addition, the processing unit may be implemented as multi-processor formed of more than one processor, such as may be connected in parallel.

The system bus 408 may be any of several types of bus structure including a memory bus or memory controller, a peripheral bus, and a local bus using any of a variety of conventional bus architectures such as PCI, VESA, Microchannel, ISA, and EISA, to name a few. The system memory 406 includes read only memory (ROM) 410 and random access memory (RAM) 412. A basic input/output system (BIOS) 414, containing the basic routines that help to transfer information between elements within the computer 402, such as during start-up, is stored in ROM 410.

The computer 402 also may include, for example, a hard disk drive 416, a magnetic disk drive 418, e.g., to read from or write to a removable disk 420, and an optical disk drive 422, e.g., for reading from or writing to a CD-ROM disk 424 or other optical media. The hard disk drive 416, magnetic disk drive 418, and optical disk drive 422 are connected to the system bus 408 by a hard disk drive interface 426, a magnetic disk drive interface 428, and an optical drive interface 430, respectively. The drives 416-422 and their associated computer-readable media provide nonvolatile storage of data, data structures, computer-executable instructions, etc. for the computer 402. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 400, and further that any such media may contain computer-executable instructions for performing the methods described herein.

A number of program modules may be stored in the drives 416-422 and RAM 412, including an operating system 432, one or more application programs 434, other program modules 436, and program data 438. The operating system 432 may be any suitable operating system or combination of operating systems. By way of example, the application programs 434 and program modules 436 can include an information searching scheme in accordance with an embodiment of the invention.

A user can enter commands and information into the computer 402 through one or more user input devices, such as a keyboard 440 and a pointing device (e.g., a mouse 442). Other input devices (not shown) may include a microphone, a joystick, a game pad, a satellite dish, a wireless remote, a scanner, or the like. These and other input devices are often connected to the processing unit 404 through a serial port interface 444 that is coupled to the system bus 408, but may be connected by other interfaces, such as a parallel port, a game port or a universal serial bus (USB). A monitor 446 or other type of display device is also connected to the system bus 408 via an interface, such as a video adapter 448. In addition to the monitor 446, the computer 402 may include other peripheral output devices (not shown), such as speakers, printers, etc.

It is to be appreciated that the computer 402 can operate in a networked environment using logical connections to one or more remote computers 460. The remote computer 460 may be a workstation, a server computer, a router, a peer device or other common network node, and typically includes many or all of the elements described relative to the computer 402, although for purposes of brevity, only a memory storage device 462 is illustrated in FIG. 4. The logical connections depicted in FIG. 4 can include a local area network (LAN) 464 and a wide area network (WAN) 466. Such networking environments are commonplace in offices, enterprise-wide computer networks, intranets and the Internet. When used in a LAN networking environment, for example, the computer 402 is connected to the local network 464 through a network interface or adapter 468. When used in a WAN networking environment, the computer 402 typically includes a modem (e.g., telephone, DSL, cable, etc.) 470, or is connected to a communications server on the LAN, or has other means for establishing communications over the WAN 466, such as the Internet. The modem 470, which can be internal or external relative to the computer 402, is connected to the system bus 408 via the serial port interface 444. In a networked environment, program modules (including application programs 434) and/or program data 438 can be stored in the remote memory storage device 462. It will be appreciated that the network connections shown are exemplary and other means (e.g., wired or wireless) of establishing a communications link between the computers 402 and 460 can be used when carrying out the methods described herein.

In accordance with the practices of persons skilled in the art of computer programming, various embodiments of the invention have been described with reference to acts and symbolic representations of operations that are performed by a computer, such as the computer 402 or remote computer 460, unless otherwise indicated. Such acts and operations are sometimes referred to as being computer-executed. It will be appreciated that the acts and symbolically represented operations include the manipulation by the processing unit 404 of electrical signals representing data bits which causes a resulting transformation or reduction of the electrical signal representation, and the maintenance of data bits at memory locations in the memory system (including the system memory 406, hard drive 416, floppy disks 420, CD-ROM 424, and remote memory 462) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of various embodiments of the invention. It is, of course, not possible to describe every conceivable combination of components or methodologies for purposes of describing the invention, but one of ordinary skill in the art may recognize that many further combinations and permutations of the these and other embodiments are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there have been shown and described and pointed out certain novel features of the invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A processor-based method for generating an output graphical object from an input graphical object, comprising:
   storing vector graphics data representing the input graphical object in a memory, wherein the vector graphics data includes instructions for creating a plurality of vector graphics components;
   determining from the instructions a first subset of the vector graphics components to leave unchanged for the output graphical object by identifying a set of prominent strokes in the input graphical object;
   determining from the instructions a second subset of vector graphics components to alter for the output object;
   determining from the instructions a third subset of vector graphics components to discard from the output object;
   altering the instructions for each vector graphics component in the second subset; and
   outputting the first and altered second subsets of vector graphics components as the output graphical object.

2. The method of claim 1, wherein the plurality of vector graphics components includes elements from the group consisting of strokes, fills, geometrical primitives, and graphical object attributes.

3. The method of claim 1, wherein the determining of the first subset includes identifying each vector graphics component that is a stroke having a line thickness within a first width tolerance.

4. The method of claim 3, wherein the determining of the first subset includes identifying each vector graphics component that is a stroke having a color within a color tolerance.

5. The method of claim 3, wherein the determining of the first subset includes identifying each vector graphics component that is a specific class of shape.

6. The method of claim 3, wherein:
   the determining of the second subset includes identifying each vector graphics component that is a stroke having a line thickness within a second width tolerance; and
   the altering includes reducing the line thickness of each stroke having the line thickness within the second width tolerance.

7. The method of claim 6, wherein:
   the determining of the second subset includes identifying each vector graphics component that has a color fill; and
   the altering includes changing each vector graphics component that has the color fill to a vector graphics component with a white fill.

8. The method of claim 7, wherein:
   the determining of the second subset includes identifying each vector graphics component that has a opacity fill that does not satisfy a threshold value; and
   the altering includes changing each vector graphics component that has the opacity fill that does not satisfy the threshold value to a vector graphics component without an opacity fill.

9. The method of claim 3, wherein the determining of the third subset includes identifying each vector graphics component that is a stroke having a line thickness outside a first width tolerance.

10. The method of claim 1, further comprising converting raster image input data to vector graphics data representing the input graphical object.

11. The method of claim 1, wherein the outputting includes storing the first and altered second subsets of vector graphics components in a computer file format.

12. The method of claim 11, wherein the computer file format is a raster image file format.

13. The method of claim 11 wherein the computer file format is a vector graphics file format.

14. The method of claim 1, wherein the vector graphics data comprises a scalable vector graphics (SVG) file.

15. A computer system for generating an output graphical object from an input graphical object, the computer system comprising:
a processor configured to:
store vector graphics data representing the input graphical object in a memory, wherein the vector graphics data includes instructions for creating a plurality of vector graphics components;
determine from the instructions a first subset of the vector graphics components to leave unchanged for the output graphical object by identifying a set of prominent strokes in the input graphical object;
determine from the instructions a second subset of vector graphics components to alter for the output object;
determine from the instructions a third subset of vector graphics components to discard from the output object;
alter the instructions for each vector graphics component in the second subset; and
output the first and altered second subsets of vector graphics components as the output graphical object.

16. The computer system of claim 15, wherein the plurality of vector graphics components includes elements from the group consisting of strokes, fills, geometrical primitives, and graphical object attributes.

17. The computer system of claim 15, wherein the determining of the first subset includes identifying each vector graphics component that is a stroke having a line thickness within a first width tolerance.

18. The computer system of claim 17, wherein the determining of the first subset includes identifying each vector graphics component that is a stroke having a color within a color tolerance.

19. The computer system of claim 17, wherein the determining of the first subset includes identifying each vector graphics component that is a specific class of shape.

20. The computer system of claim 17, wherein:
the determining of the second subset includes identifying each vector graphics component that is a stroke having a line thickness within a second width tolerance; and
the altering includes reducing the line thickness of each stroke having the line thickness within the second width tolerance.

21. The computer system of claim 20, wherein:
the determining of the second subset includes identifying each vector graphics component that has a color fill; and
the altering includes changing each vector graphics component that has the color fill to a vector graphics component with a white fill.

22. The computer system of claim 21, wherein:
the determining of the second subset includes identifying each vector graphics component that has a opacity fill that does not satisfy a threshold value; and
the altering includes changing each vector graphics component that has the opacity fill that does not satisfy the threshold value to a vector graphics component without an opacity fill.

23. The computer system of claim 17, wherein the determining of the third subset includes identifying each vector graphics component that is a stroke having a line thickness outside a first width tolerance.

24. The computer system of claim 15, wherein the vector graphics data comprises a scalable vector graphics (SVG) file.

25. An electronic system, comprising
means for storing vector graphics data representing the input graphical object in a memory, wherein the vector graphics data includes instructions for creating a plurality of vector graphics components;
means for determining from the instructions a first subset of the vector graphics components to leave unchanged for the output graphical object by identifying a set of prominent strokes in the input graphical object;
means for determining from the instructions a second subset of vector graphics components to alter for the output object;
means for determining from the instructions a third subset of vector graphics components to discard from the output object;
means for altering the instructions for each vector graphics component in the second subset; and
means for outputting the first and altered second subsets of vector graphics components as the output graphical object.

26. The electronic system of claim 25, wherein the vector graphics data comprises a scalable vector graphics (SVG) file.

* * * * *